(12) United States Patent
Matsushita et al.

(10) Patent No.: US 12,467,815 B2
(45) Date of Patent: Nov. 11, 2025

(54) PRESSURE AND TEMPERATURE SENSOR (71) Applicants: EAGLE INDUSTRY CO., LTD., Tokyo (JP); VALCOM CO., LTD., Osaka (JP)

(72) Inventors: Tadayoshi Matsushita, Osaka (JP); Kentaro Yamamoto, Osaka (JP); Kazuhiro Takahashi, Tokyo (JP); Keizo Oishi, Tokyo (JP); Hiroshi Kokita, Osaka (JP)

(73) Assignees: EAGLE INDUSTRY CO., LTD., Tokyo (JP); VALCOM CO., LTD., Osaka (JP)

( * ) Notice: Subject to any disclaimer, the term of this patent is extended or adjusted under 35 U.S.C. 154(b) by 268 days.

(21) Appl. No.: 18/032,517

(22) PCT Filed: Oct. 8, 2021

(86) PCT No.: PCT/JP2021/037442
§ 371 (c)(1),
(2) Date: Apr. 20, 2023

(87) PCT Pub. No.: WO2022/085497
PCT Pub. Date: Apr. 28, 2022

(65) Prior Publication Data
US 2023/0384177 A1    Nov. 30, 2023

(30) Foreign Application Priority Data

Oct. 20, 2020 (JP) ................................ 2020-175802

(51) Int. Cl.
*G01L 19/04* (2006.01)
*G01K 7/16* (2006.01)
(Continued)

(52) U.S. Cl.
CPC ............ *G01L 19/0092* (2013.01); *G01K 7/16* (2013.01); *G01K 13/02* (2013.01); *G01L 9/0001* (2013.01)

(58) Field of Classification Search
CPC ................. G01L 19/00; G01L 19/0092; G01L 19/04–06; G01L 19/14; G01L 9/0001; G01K 7/16; G01K 13/02
See application file for complete search history.

(56) References Cited

U.S. PATENT DOCUMENTS 10,203,255 B2 * 2/2019 Wagner ................ G01L 27/002
2019/0204174 A1 7/2019 Sixtensson et al. .... G01L 19/04

FOREIGN PATENT DOCUMENTS

CN    102435378 A    5/2012
CN    103454032      12/2013  ............... G01L 9/02
(Continued)

OTHER PUBLICATIONS

DE-102011109461-A1 Machine Translation (Year: 2011).*
(Continued)

*Primary Examiner* — Nguyen Q. Ha
(74) *Attorney, Agent, or Firm* — HAYES SOLOWAY P.C.

(57) ABSTRACT

Disclosed is a pressure and temperature sensor capable of precisely measuring a pressure. A sensor body, a diaphragm defining an accommodation space together with the sensor body, and a transmission substance charged in the accommodation space are provided, and a pressure measurement body and a temperature measurement body which is a separate body from the pressure measurement body are disposed in the accommodation space.

21 Claims, 4 Drawing Sheets

(51) Int. Cl.
  *G01K 13/02* (2021.01)
  *G01L 9/00* (2006.01)
  *G01L 19/00* (2006.01)
  *G01L 19/06* (2006.01)

(56) References Cited

FOREIGN PATENT DOCUMENTS

| | | | |
|---|---|---|---|
| CN | 106768592 A | 5/2017 | |
| CN | 108871483 | 11/2018 | ............ G01F 15/04 |
| DE | 102011109461 A1 * | 2/2013 | ............... G01K 7/20 |
| JP | 5332866 | 12/1993 | ............... G01L 9/04 |
| JP | 2009121871 | 6/2009 | ............... G01K 1/16 |
| JP | 20132885 | 1/2013 | ............ G01L 19/14 |
| JP | 201670689 | 5/2016 | ............ G01L 19/06 |
| WO | 2019124102 A1 | 6/2019 | |

OTHER PUBLICATIONS

European Search Report issued in EP Patent Appln. No. 21882638.6, dated Aug. 26, 2024, 9 pgs.
International Search Report and Written Opinion issued in PCT/JP2021/037442, dated Nov. 2, 2021, with English translation, 13 pages.
International Preliminary Report on Patentability issued in PCT/JP2021/037442, dated Apr. 13, 2023, 5 pages.

* cited by examiner

PRESSURE AND TEMPERATURE SENSOR

TECHNICAL FIELD

The present invention relates to a pressure and temperature sensor capable of measuring a pressure and a temperature of a fluid to be measured.

BACKGROUND ART

In various fields, a pressure and a temperature are utilized for operation, maintenance, etc. of devices, both the pressure and the temperature are often used, and a pressure and temperature sensor is utilized for responding to a demand to obtain the pressure and the temperature at the same time. The pressure and temperature sensor includes a pressure measurement body that outputs a pressure signal in accordance with a pressure of a fluid to be measured, and a temperature measurement body that outputs a temperature signal in accordance with a temperature of the fluid to be measured, and is capable of transmitting the pressure signal and the temperature signal to an external device.

Regarding such a pressure and temperature sensor, the pressure measurement body and the temperature measurement body are arranged in the fluid to be measured, and sometimes chemically or mechanically influenced from the fluid to be measured and damaged. Therefore, an isolation type pressure and temperature sensor in which a pressure measurement body and a temperature measurement body are in indirect contact with a fluid to be measured is widely used.

In the isolation type pressure and temperature sensor, for example, the pressure measurement body and the temperature measurement body are arranged in an accommodation space defined by a sensor body and a diaphragm, and a transmission substance is charged in the accommodation space. The pressure measurement body outputs a pressure signal in accordance with a pressure of the transmission substance which receives a pressure of the fluid to be measured via the diaphragm. The temperature measurement body outputs a temperature signal in accordance with a temperature of the transmission substance which receives a temperature of the fluid to be measured via the diaphragm. After that, the pressure signal and the temperature signal are converted into a pressure measurement value and a temperature measurement value by an integrated circuit, etc. provided in a substrate.

In a pressure and temperature sensor shown in Patent Citation 1 serving as an example of such an isolation type pressure and temperature sensor, a sensor chip integrally including a pressure measurement body and a temperature measurement body is arranged in an accommodation space in which a transmission substance such as silicon oil is charged. The sensor chip is of a semiconductor diaphragm type including a bridge circuit. When a pressure is applied to the sensor chip, an intermediate voltage of the bridge circuit that functions as the pressure measurement body is changed, and the sensor chip outputs a pressure signal in accordance with this change. When a temperature of the sensor chip is changed, a voltage between both ends of the bridge circuit that functions as the temperature measurement body is changed, and the sensor chip outputs a temperature signal in accordance with this change.

In such a way, in the pressure and temperature sensor as in Patent Citation 1, it is possible to measure the pressure and the temperature by the sensor chip integrally including the pressure measurement body and the temperature measurement body. Therefore, it is possible to downsize. However, since two types of measurement values are measured by the integrated sensor chip, a structure of the pressure and temperature sensor as in Patent Citation 1 is limited. Further, a pressure change of the transmission substance influences the temperature measurement body. Similarly, a temperature change of the transmission substance influences the pressure measurement body. Thereby, the pressure and temperature sensor as in Patent Citation 1 is not capable of measuring precise values by the respective measurement bodies.

Therefore, with the pressure and temperature sensor as in Patent Citation 1, for example, it is difficult to make correction with an influence of the temperature over measurement of the pressure in accordance with the temperature signal. From this, the measured pressure measurement value and the measured temperature measurement value have poor precision. By the way, it is also possible to determine a relationship between the pressure and the temperature in advance by calibration, and obtain a precise pressure measurement value and a precise temperature measurement value. However, the sensor chip is manufactured by using a semiconductor process, and variation for each production lot is very large. Therefore, there is a problem that, since the sensor chip requires calibration for the pressure and the temperature for an individual object, it takes a lot of trouble.

In a pressure and temperature sensor shown in Patent Citation 2 serving as another example of the pressure and temperature sensor, a pressure measurement body and a temperature measurement body are separate bodies. Specifically, the pressure measurement body is arranged in an accommodation space in which a transmission substance is charged. The temperature measurement body is arranged to project from center of a diaphragm to the fluid to be measured side. The temperature measurement body is formed by fixing a thermistor arranged in a cap-shaped housing portion by charging resin having high thermal conductivity.

CITATION LIST

Patent Literature

Patent Citation 1: JP 2009-121871 A (p. 6 to 8, FIG. 2)
Patent Citation 2: JP 2013-2885 A (p. 6 to 9, FIG. 1)

SUMMARY OF INVENTION

Technical Problem

In such a way, in the pressure and temperature sensor as in Patent Citation 2, the pressure measurement body and the temperature measurement body are separate bodies, and it is possible to separately output a pressure signal or a temperature signal. Therefore, with the pressure and temperature sensor as in Patent Citation 2, it is possible to make correction with an influence of the temperature over the pressure measurement body in accordance with a temperature signal. By the way, part of the temperature measurement body is arranged to be exposed to the fluid to be measured, whereas the pressure measurement body is arranged in the transmission substance. Therefore, in a case where a temperature of the fluid to be measured is changed, a temperature change transmitted to the pressure measurement body is delayed more than a temperature change transmitted to the temperature measurement body, and it is sometimes not possible to precisely obtain a pressure measurement value even upon making the correction described above.

The present invention is achieved focusing on such a problem, and an object of the present invention is to provide a pressure and temperature sensor capable of precisely measuring a pressure.

Solution to Problem

In order to solve the foregoing problems, a pressure and temperature sensor according to the present invention includes: a sensor body; a diaphragm defining an accommodation space together with the sensor body; a transmission substance charged in the accommodation space; a pressure measurement body disposed in the accommodation space; and a temperature measurement body disposed in the accommodation space. According to the aforesaid feature of the present invention, for example, even when a temperature of a fluid to be sealed is changed, the pressure and temperature sensor is capable of correcting a value of a pressure measured by the pressure measurement body with a precise temperature measured by the temperature measurement body. Thereby, the pressure and temperature sensor is capable of precisely measuring the pressure.

It may be preferable that the pressure measurement body and the temperature measurement body are arranged on a side of the sensor body. According to this preferable configuration, the measurement bodies are installed on the static side. Therefore, a physical change given to the measurement bodies is small.

It may be preferable that the pressure and temperature sensor further includes bonding wires electrically connected to at least one of the pressure measurement body and the temperature measurement body, and in the accommodation space, a buffering member that buffers the transmission substance is arranged between the diaphragm, and the pressure measurement body, the temperature measurement body, and the bonding wires. According to this preferable configuration, even when a high pressure acts on the diaphragm from a fluid to be measured for a short time, the diaphragm is not largely deformed. Thereby, no large force acts on the pressure measurement body, the temperature measurement body, and the bonding wires themselves from the transmission substance. Therefore, connection between the pressure measurement body and the bonding wire and connection between the temperature measurement body and the bonding wire are protected.

It may be preferable that the buffering member is arranged more closely to the diaphragm than the pressure measurement body and the temperature measurement body. According to this preferable configuration, a space between the diaphragm and the buffering member is narrowed down. Thereby, even when a high pressure acts from the fluid to be measured for a short time, no large pressure acts on the transmission substance in a space in which the pressure measurement body and the temperature measurement body are housed.

It may be preferable that a through hole is formed in the buffering member. According to this preferable configuration, the through hole exerts an orifice function. Therefore, a configuration of the buffering member is simple.

It may be preferable that the buffering member is formed so that an axis of the through hole is out of the pressure measurement body and the temperature measurement body. According to this preferable configuration, the transmission substance moved through the through hole less easily directly acts on the pressure measurement body and the temperature measurement body. Thereby, the pressure measurement body and the temperature measurement body are protected.

It may be preferable that the temperature measurement body is a resistance temperature detector. According to this preferable configuration, an influence of the pressure acting on the temperature measurement body is reduced. Therefore, the pressure and temperature sensor is capable of more simply and more precisely measuring the temperature and the pressure.

It may be preferable that the pressure measurement body and the temperature measurement body are separate bodies. According to this preferable configuration, the pressure measurement body and the temperature measurement body which are separate bodies are arranged in the common accommodation space. Thereby, the pressure and temperature sensor is able to have a structure in which measurement bodies suitable for respective measurement values can be adopted and an influence received from the other measurement value is small.

It may be preferable that a measurement value of the pressure measurement body and a measurement value of the temperature measurement body are corrected with respect to each other. According to this preferable configuration, the pressure and temperature sensor is capable of precisely measuring the pressure and the temperature.

DESCRIPTION OF EMBODIMENTS

A mode for implementing a pressure and temperature sensor according to the present invention will be described below based on an embodiment.

Embodiment

A pressure and temperature sensor according to the embodiment of the present invention will be described with reference to FIGS. 1 to 4. The upper and lower sides seen from the front surface side of FIG. 2 will be the upper and lower sides of the pressure and temperature sensor in the following description. In detail, the upper side on the paper plane where a connector 11 is arranged will be the upper side of the pressure and temperature sensor and the lower side on the paper plane where a diaphragm cover 22 is arranged will be the lower side of the pressure and temperature sensor in the description.

Figure 1:
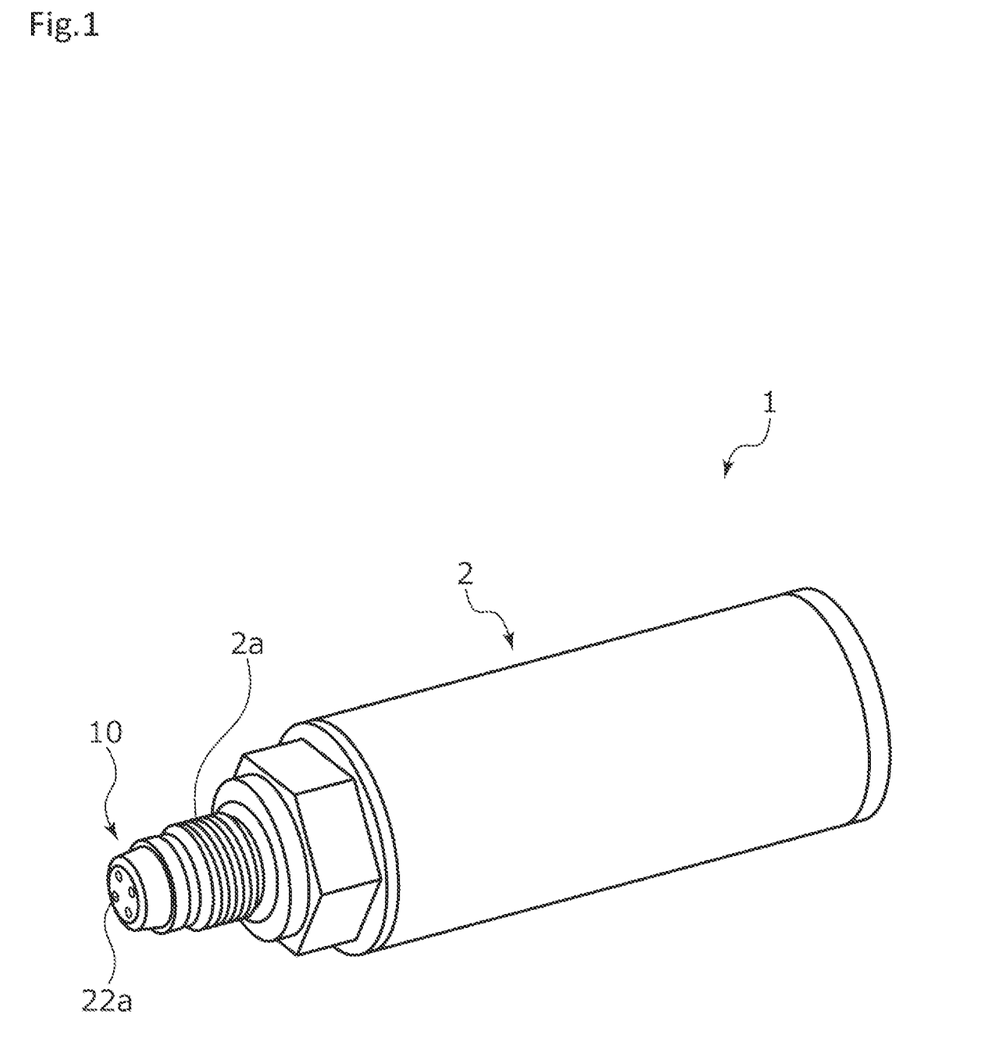
FIG. 1 is a perspective view of a pressure and temperature sensor according to an embodiment of the present invention.

As shown in FIG. 1, a pressure and temperature sensor 1 of the present invention is formed to be capable of detecting a pressure of a measurement object, and a battery cell (not shown) is a power source. The pressure and temperature sensor 1 is fixed to an installed portion such as a pipe, a duct, and a tank (not shown), and detects the pressure and a temperature of the measurement object inside the installed portion. The measurement object is a fluid to be measured of a liquid, a gas, etc.

As shown in FIG. 1, the pressure and temperature sensor 1 is mainly formed by a power source unit 2 and a sensor unit 10. For example, by screwing a threaded portion 2a formed in a lower end portion of the power source unit 2 into an attachment port of a pipe (not shown), the pressure and temperature sensor 1 is fixed to the pipe (not shown) and used.

Figure 2:
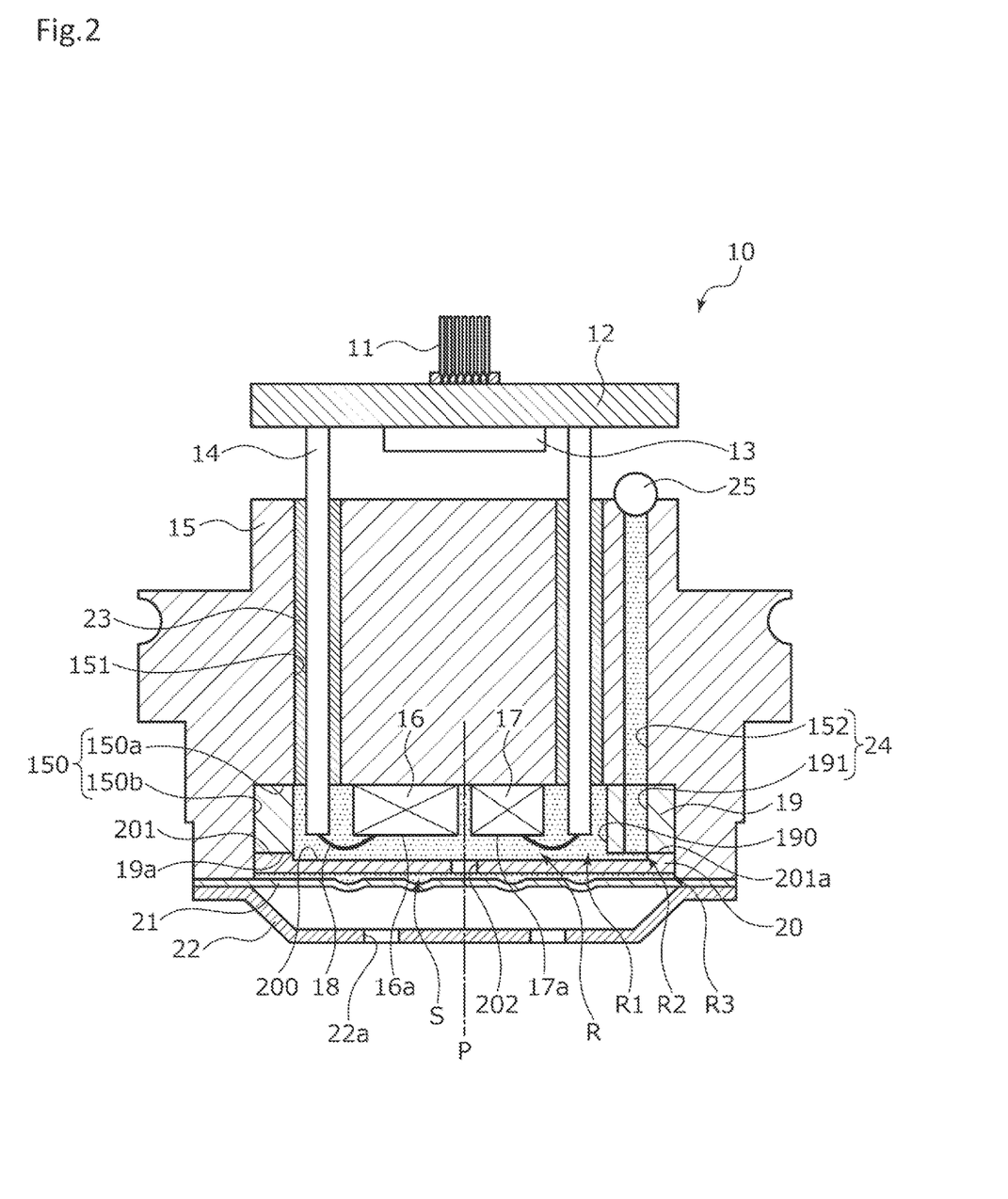
FIG. 2 is a sectional view of major portions of the pressure and temperature sensor according to the embodiment of the present invention.

As shown in FIG. 2, the sensor unit 10 is mainly formed by, in order from the upper side, the connector 11, a substrate 12, a signal processing circuit 13, a plurality of electrode pins 14, a sensor body 15, a pressure measurement body 16, a temperature measurement body 17, a plurality of bonding wires 18, a spacer 19, an indoor cover 20 serving as a buffering member, a diaphragm 21, and the diaphragm cover 22.

The connector 11 is electrically connected to the power source unit 2. The connector 11, the signal processing circuit 13, and the plurality of electrode pins 14 are electrically connected to the substrate 12. The sensor body 15 is made of a metal material or a resin material.

The pressure measurement body 16 and the temperature measurement body 17 are arranged in a recessed portion 150 of the sensor body 15. The plurality of bonding wires 18 is electrically connected to the electrode pin 14 and the pressure measurement body 16, or the electrode pin 14 and the temperature measurement body 17.

The spacer 19 is arranged in the recessed portion 150. The diaphragm 21 is made of a metal material or a resin material. The diaphragm cover 22 is made of a metal material or a resin material. Silicon oil S serving as a transmission substance is charged in an accommodation space R defined by the sensor body 15 and the diaphragm 21.

The sensor body 15 is formed in a bottomed cylindrical shape. In the sensor body 15, the recessed portion 150, a plurality of communication holes 151, and a communication passage 152 are formed. The recessed portion 150 is recessed upward in the axial direction from a lower end of the sensor body 15. The communication hole 151 passes through in the axial direction from an outer diameter side end portion of a bottom surface 150a of the recessed portion 150. The communication passage 152 passes through in the axial direction on the outer diameter side of one of the communication holes 151 on the bottom surface 150a.

The communication holes 151 are arranged at a substantially equal interval in the circumferential direction. Each of the communication holes 151 is sealed by a hermetic seal 23 in a state where one of the electrode pins 14 is inserted.

In the recessed portion 150, an upper end surface of the pressure measurement body 16 and an upper end surface of the temperature measurement body 17 are attached to a center portion of the bottom surface 150a by an adhesive.

The pressure measurement body 16 is a MEMS (Micro Electro Mechanical Systems) device. A sensing surface 16a serving as a lower surface of the pressure measurement body 16 is arranged to oppose the diaphragm 21. When a pressure acting on the sensing surface 16a is changed, a resistance value of a gauge resistance (not shown) is changed. By utilizing this, the pressure measurement body 16 outputs a voltage in accordance with the pressure as a pressure signal, that is, a measurement value.

A sensing surface 17a serving as a lower surface of the temperature measurement body 17 is arranged to oppose the diaphragm 21. When a temperature acting on the sensing surface 17a is changed, an electric resistance value is changed. By utilizing this, the temperature measurement body 17 outputs a voltage in accordance with the temperature as a temperature signal, that is, a measurement value.

The temperature measurement body 17 is preferably a platinum resistance temperature detector, or may be resistance temperature detectors other than the platinum resistance temperature detector such as a copper resistance temperature detector and a nickel resistance temperature detector.

The spacer 19 formed in a cylindrical shape along a peripheral surface 150b substantially orthogonal to the bottom surface 150a is fitted to the recessed portion 150. An upper end surface of the spacer 19 is attached to the outer diameter side end portion of the bottom surface 150a by an adhesive.

Figure 3:
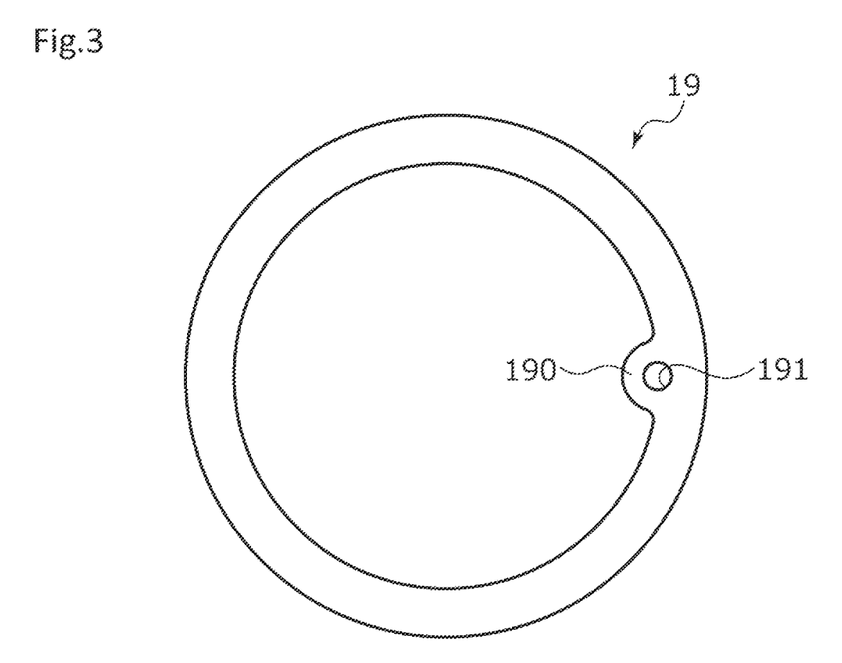
FIG. 3 is a top view of a spacer in the embodiment.

With reference to FIGS. 2 and 3, the spacer 19 is made of aluminum. An axial size of the spacer 19 is formed to be substantially identical. A radial size of the spacer 19 is formed to be substantially identical except that a thick width portion 190 expanded to the inner diameter side is partly formed. A communication passage 191 passing through in the axial direction is formed in the thick width portion 190. This communication passage 191 is formed to be aligned with the communication passage 152 of the sensor body 15. A through flow passage 24 communicating with the accommodation space R is formed by these communication passages 152 and 191.

With reference to FIG. 2, the through flow passage 24 is a flow passage used at the time of charging the silicon oil S into the accommodation space R. After the silicon oil S is charged, an oil plug 25 is fitted to an upper end portion of the through flow passage 24, and the through flow passage 24 is sealed.

The indoor cover 20 formed in a disc shape along the peripheral surface 150b is fitted to the recessed portion 150. An upper end surface of the indoor cover 20 is attached to a lower end surface of the spacer 19 by an adhesive.

Figure 4:
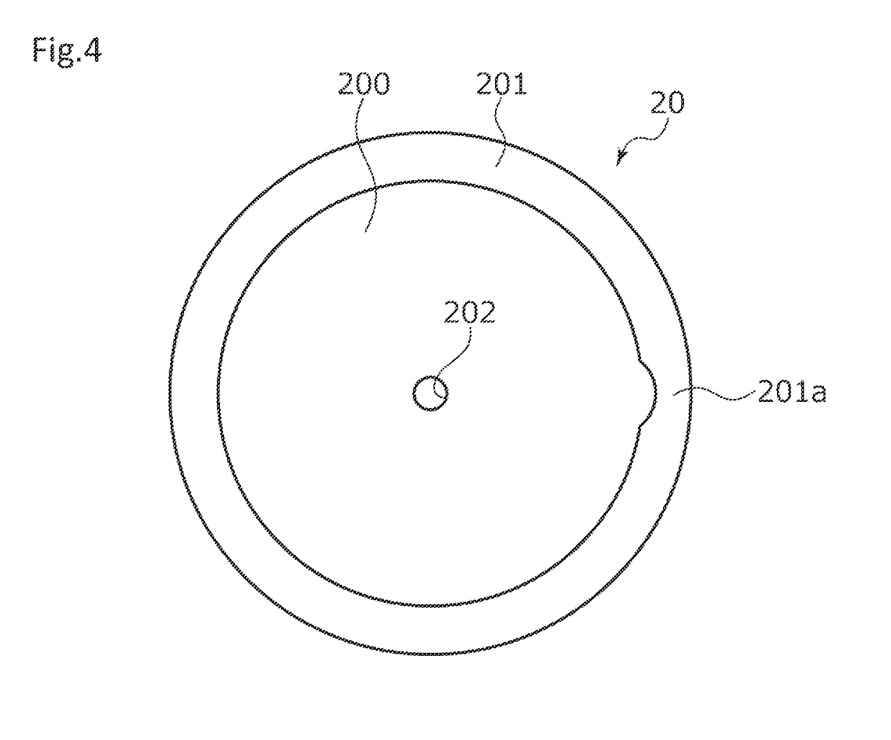
FIG. 4 is an upper surface view of an indoor cover in the embodiment.

With reference to FIGS. 2 and 4, the indoor cover 20 is made of aluminum. The indoor cover 20 has a base portion 200 and a peripheral wall 201. The base portion 200 has a circular flat plate shape. The peripheral wall 201 has a ring shape extending upward in the axial direction from the outer peripheral side end portion of the base portion 200. A through hole 202 passing through in the axial direction is formed in center of the base portion 200.

An axial size of the peripheral wall 201 of the indoor cover 20 is formed to be substantially identical. A radial size of the peripheral wall 201 is formed to be substantially identical except that a thin width portion 201a in which part on the inner diameter side is recessed to the outer diameter side is formed. This thin width portion 201a is formed to be aligned with the thick width portion 190 of the spacer 19.

The diaphragm 21 is fixed to the lower end of the sensor body 15 by welding or an adhesive. The accommodation space R formed between the recessed portion 150 of the sensor body 15 and the diaphragm 21 is isolated from the fluid to be measured.

In more detail, the accommodation space R is partitioned into a space R1 and a space R3. The space R1 is defined by the bottom surface 150a of the recessed portion 150, the spacer 19, and the indoor cover 20. The space R3 is defined by the indoor cover 20, the peripheral surface 150b of the recessed portion 150, and the diaphragm 21. Communication is provided between the space R1 and the space R3 by the through hole 202 of the indoor cover 20.

Among the space R1, a space defined by a lower end surface of the thick width portion 190 of the spacer 19, an inner peripheral surface of the thin width portion 201a of the indoor cover 20, and an upper end surface of the base portion 200 is called as a space R2.

With reference to FIG. 2, a height size of the peripheral wall 201 of the indoor cover 20, in more detail, a size from the upper end surface of the base portion 200 to an upper end surface of the peripheral wall 201 is shorter than a thickness size of the base portion 200. Thereby, a height size of the space R2 is also shorter than the thickness size of the base portion 200. In such a way, the space R2 is a very narrow space among the space R1.

The diaphragm cover 22 formed in a dish shape is fixed to a lower end of the diaphragm 21 by welding or an adhesive. In a bottom portion of the diaphragm cover 22, a plurality of communication passages 22a passing through in the axial direction is formed.

Next, a method of outputting the pressure and temperature measurement values by the pressure and temperature sensor 1 will be described. In the pressure and temperature sensor 1 fixed to the attachment port of the pipe, the fluid to be measured flows into a space between the diaphragm 21 and the diaphragm cover 22 through the communication passages 22a. A pressure and a temperature are transmitted from this fluid to be measured to the silicon oil S via the diaphragm 21. Therefore, a voltage in accordance with a pressure of the silicon oil S is obtained from the pressure measurement body 16. A voltage in accordance with a temperature of the silicon oil S is obtained from the temperature measurement body 17.

The voltage obtained from the pressure measurement body 16 or the temperature measurement body 17 is an analog signal. After amplified by an amplifier circuit (not shown) provided in the substrate 12, the analog signal is inputted to the signal processing circuit 13, converted into a digital signal in an A/D conversion unit, and then corrected in a correction unit. The amplifier circuit may be provided or may not be provided in the pressure measurement body 16 and the temperature measurement body 17.

The digital signal is less easily influenced by an external factor such as noises than the analog signal. From this, in comparison to a configuration that the signal is A/D-converted in the power source unit 2, an external device, etc., the pressure and temperature sensor 1 of the present embodiment is capable of outputting precise pressure and temperature measurement values to an external device.

The correction in the signal processing circuit 13 described above will be described. In the correction unit, digitally-converted temperature data is compared with reference data, and in accordance with a difference of this, digitally-converted pressure data is corrected. Thereby, the pressure and temperature sensor 1 is capable of precisely measuring the pressure and the temperature.

In the correction unit, digitally-converted pressure data may be compared with reference data, and in accordance with a difference of this, digitally-converted temperature data may be corrected. Further, in the correction unit, the pressure data and the temperature data may be corrected with respect to each other.

Further, although the example that the correction unit makes correction by using the data after digital conversion is described, analog data may be corrected and then converted in the A/D conversion unit.

As described above, for example, even when a temperature of the fluid to be sealed is changed, the pressure and temperature sensor 1 of the present embodiment is capable of correcting a value of the pressure measured by the pressure measurement body 16 with the precise temperature measured by the temperature measurement body 17. Thereby, the pressure and temperature sensor 1 is capable of precisely measuring the pressure.

The pressure and the temperature act on the pressure measurement body 16 and the temperature measurement body 17 through the common silicon oil S. Thereby, even when the temperature of the fluid to be sealed is changed, the signal processing circuit 13 is capable of correcting an influence of the temperature over the pressure measurement body 16 without getting delayed. Therefore, the pressure and temperature sensor 1 is capable of precisely measuring the pressure.

The pressure measurement body 16 and the temperature measurement body 17 are arranged in the sensor body 15 which is not activated by a pressure change or a temperature change. Therefore, a physical change given to the pressure measurement body 16 and the temperature measurement body 17 is small.

Regarding the pressure measurement body 16 and the temperature measurement body 17, both the sensing surfaces 16a and 17a are arranged to oppose the diaphragm 21. In other words, the sensing surfaces 16a and 17a are arranged to face in the identical direction. Therefore, a temporal difference between a temperature acting on the temperature measurement body 17 and a temperature acting on the pressure measurement body 16 becomes smaller.

When a shock wave, etc. occurs in the fluid to be measured and a high pressure acts on the diaphragm 21 for a short time, the diaphragm 21 is recessed to the space R3 side. At this time, the through hole 202 of the indoor cover 20 functions as an orifice that restricts a flow rate of the silicon oil S flowing from the space R3 into the space R1. Thereby, the diaphragm 21 is not largely deformed. From this, a large force does not act on the pressure measurement body 16, the temperature measurement body 17, and the bonding wires 18 from the silicon oil S.

In particular, the pressure measurement body 16 is a MEMS in which an external size is approximately a few mm and a thin point is less than 1 mm, and hence has trouble in durability against an external force. Connection points of the bonding wires 18 connected to these are minute and possibly exfoliated by an external force. Thus, in the pressure and temperature sensor 1 of the present embodiment, as described above, connection between the pressure measurement body 16 and the bonding wire 18 and connection between the temperature measurement body 17 and the bonding wire 18 are protected by the indoor cover 20. Although the bonding wires 18 are made of metal such as gold and aluminum, the bonding wires 18 may be made of other materials as long as measurement signals can be transmitted.

The indoor cover 20 is arranged more closely to the diaphragm 21 than the pressure measurement body 16 and the temperature measurement body 17. Even considering a difference between a diameter of the space R1 and a diameter of space R3, the space R3 is narrower than the space R1. From this, even when a shock wave, etc. occurs in the fluid to be measured and a high pressure acts on the diaphragm 21 for a short time, an amount of the silicon oil S moved from the space R3 to the space R1 is small. In other words, no large pressure acts on the silicon oil S of the space R1 in which the pressure measurement body 16 and the temperature measurement body 17 are accommodated.

As described above, the through hole 202 exerts an orifice function. Therefore, a configuration of the indoor cover 20 capable of buffering the silicon oil S is simple.

The through hole 202 of the indoor cover 20 is arranged so that an axis P shown by a one-chain line passes through between the pressure measurement body 16 and the temperature measurement body 17 arranged in the recessed portion 150. Therefore, the silicon oil S moved through the through hole 202 less easily directly acts on the pressure measurement body 16 and the temperature measurement body 17. Thereby, the pressure measurement body 16 and the temperature measurement body 17 are protected.

In addition, the electrode pins 14 are arranged on the outer diameter side of the pressure measurement body 16 and the temperature measurement body 17. Therefore, connection between the electrode pins 14 and the bonding wires 18, connection between the pressure measurement body 16 and the bonding wire 18, and connection between the temperature measurement body 17 and the bonding wire 18 are protected favorably.

Any of the plurality of electrode pins 14 is arranged on the outer diameter side of the pressure measurement body 16 or the temperature measurement body 17. Therefore, in comparison to a configuration that electrode pins 14 are arranged between a pressure measurement body 16 and a temperature measurement body 17, it is possible to arrange the pressure measurement body 16 and the temperature measurement body 17 closely to each other. Thereby, a temporal difference before the temperature and the pressure act on the pressure measurement body 16 or the temperature measurement body 17 is more reduced.

The space R2 is a very narrow space among the space R1. The space R2 is relatively separate from the through hole 202 of the indoor cover 20. Thereby, the through flow passage 24 is less easily influenced by the pressure and the temperature of the fluid to be measured from the space R2.

The through flow passage 24 communicates with the space R2 in an outer diameter end of the space R1. For example, in comparison to a configuration that an axis of the through flow passage 24 is positioned between the pressure measurement body 16 and the temperature measurement body 17, the pressure and the temperature of the fluid to be measured are more easily transmitted to a space in the space R1 excluding the space R2. Thereby, the pressure and temperature sensor 1 is capable of precisely measuring the pressure and the temperature of the fluid to be measured for a short time.

The temperature measurement body 17 is a resistance temperature detector. From this, an influence of the pressure acting on the temperature measurement body 17 is reduced. Therefore, the pressure and temperature sensor 1 is capable of more simply and more precisely measuring the temperature and the pressure.

The pressure measurement body 16 and the temperature measurement body 17 which are separate bodies are arranged in the common accommodation space R in which the silicon oil S is charged. Thereby, the pressure and temperature sensor 1 is able to have a structure in which the measurement bodies 16 and 17 suitable for the respective measurement values can be adopted and an influence received from the other measurement value is small.

With the communication passages 22a of the diaphragm cover 22, foreign substances, etc. less easily invade the space between the diaphragm 21 and the diaphragm cover 22. Therefore, the diaphragm cover 22 is capable of protecting the diaphragm 21.

The space R2 is formed by the thick width portion 190 of the spacer 19 and the thin width portion 201a of the indoor cover 20 which are separate bodies from each other. The communication passage 191 communicating with the space R2 is formed in the spacer 19. Thereby, in comparison to a mode that a space R2 and a communication passage 191 are integrally formed, it is possible to simply form the space R2 and the communication passage 191 of the present embodiment.

The indoor cover 20 is made of aluminum having high thermal conductivity. Thereby, heat is more easily transmitted to the silicon oil S in the space R1. Therefore, the pressure and temperature sensor 1 has good responsiveness to measure the pressure and the temperature. The indoor cover 20 is not limited to aluminum but may be made of other metal or resin having high thermal conductivity.

Both the spacer 19 and the indoor cover 20 are made of aluminum. Thereby, an influence of thermal expansion due to the temperature of the silicon oil S is substantially identical. Therefore, the spacer 19 and the indoor cover 20 are less easily broken. The spacer 19 and the indoor cover 20 are preferably made of materials having the same thermal expansion rate but may be made of materials having different thermal expansion rates.

The embodiment of the present invention is described above with the drawings. However, specific configurations are not limited to the embodiment and the present invention includes changes and additions within the range not departing from the scope of the present invention.

For example, in the embodiment described above, the description is given as the configuration that no atmospheric pressure acts on the pressure measurement body and an absolute pressure is measured. However, the present invention is not limited to this but by letting an atmospheric pressure act on the pressure measurement body, a gauge pressure may be measured.

The description is also given as the configuration that the temperature measurement body is a resistance temperature detector. However, the present invention is not limited to this but the temperature measurement body may be a thermocouple, a thermistor, a resistance element, etc. or may be properly changed.

The description is also given as the configuration that the pressure measurement body and the temperature measurement body are arranged on the bottom surface of the same recessed portion. However, the present invention is not limited to this but the pressure measurement body and the temperature measurement body may be arranged on the peripheral surface of the recessed portion.

The description is also given as the configuration that the transmission substance is the silicon oil. However, the present invention is not limited to this but the transmission substance may be water, air, oil, etc. or may be properly changed.

The description is also given as the configuration that the spacer has the thick width portion. However, the present invention is not limited to this but a radial size of a peripheral wall, that is, a thickness size may be relatively longer than and substantially identical over the circumferential direction to the thickness size of the peripheral wall of the indoor cover. With such a configuration, by forming the through flow passage after fixing the spacer to the sensor body, the through flow passage and a space communicating with the through flow passage are more easily formed.

REFERENCE SIGNS LIST

1 Pressure and temperature sensor
10 Sensor unit
15 Sensor body
16 Pressure measurement body
16a Sensing surface
17 Temperature measurement body 17a Sensing surface
18 Bonding wire
20 Indoor cover (buffering member)
21 Diaphragm
202 Through hole
P Axis
R Accommodation space
S Silicon oil (transmission substance)

The invention claimed is:

1. A pressure and temperature sensor comprising:
a sensor body;
a diaphragm defining an accommodation space together with the sensor body;
a transmission substance charged in the accommodation space;
a pressure measurement body disposed in the accommodation space;
a temperature measurement body disposed in the accommodation space;
a buffering member having a base portion which is disposed between the diaphragm and the pressure measurement body and between the diaphragm and the temperature measurement body in the accommodation space and which is configured to buffer the transmission substance; and
a through flow passage which has an opening portion opened toward the base portion of the buffering member, and which is configured to the accommodation space through the opening portion and to be closed after the transmission substance is charged in the accommodation space through the through flow passage,
wherein an axial dimension between the buffering member in the accommodation space and the opening portion of the through flow passage is shorter than a thickness of the base portion of the buffering member.

2. The pressure and temperature sensor according to claim 1, wherein
the pressure measurement body and the temperature measurement body are arranged on a side of the sensor body.

3. The pressure and temperature sensor according to claim 1, further comprising:
bonding wires electrically connected to at least one of the pressure measurement body and the temperature measurement body.

4. The pressure and temperature sensor according to claim 3, wherein
the buffering member is arranged more closely to the diaphragm than to the pressure measurement body and the temperature measurement body.

5. The pressure and temperature sensor according to claim 3, wherein
a through hole is formed in the buffering member.

6. The pressure and temperature sensor according to claim 5, wherein
the buffering member is formed so that an axis of the through hole is out of offset from the pressure measurement body and the temperature measurement body.

7. The pressure and temperature sensor according to claim 1, wherein
the temperature measurement body is a resistance temperature detector.

8. The pressure and temperature sensor according to claim 1, wherein
the pressure measurement body and the temperature measurement body are separate bodies.

9. The pressure and temperature sensor according to claim 1, wherein
a measurement value of the pressure measurement body and a measurement value of the temperature measurement body are corrected with respect to each other.

10. The pressure and temperature sensor according to claim 2, further comprising:
bonding wires electrically connected to at least one of the pressure measurement body and the temperature measurement body.

11. The pressure and temperature sensor according to claim 10, wherein
the buffering member is arranged more closely to the diaphragm than to the pressure measurement body and the temperature measurement body.

12. The pressure and temperature sensor according to claim 10, wherein
a through hole is formed in the buffering member.

13. The pressure and temperature sensor according to claim 12, wherein
the buffering member is formed so that an axis of the through hole is out of offset from the pressure measurement body and the temperature measurement body.

14. The pressure and temperature sensor according to claim 4, wherein
a through hole is formed in the buffering member.

15. The pressure and temperature sensor according to claim 14, wherein
the buffering member is formed so that an axis of the through hole is out of offset from the pressure measurement body and the temperature measurement body.

16. The pressure and temperature sensor according to claim 2, wherein
the temperature measurement body is a resistance temperature detector.

17. The pressure and temperature sensor according to claim 2, wherein
the pressure measurement body and the temperature measurement body are separate bodies.

18. The pressure and temperature sensor according to claim 2, wherein
a measurement value of the pressure measurement body and a measurement value of the temperature measurement body are corrected with respect to each other.

19. The pressure and temperature sensor according to claim 3, wherein
the temperature measurement body is a resistance temperature detector.

20. The pressure and temperature sensor according to claim 3, wherein
the pressure measurement body and the temperature measurement body are separate bodies.

21. A pressure and temperature sensor comprising:
a sensor body;
a diaphragm defining an accommodation space together with the sensor body;
a transmission substance charged in the accommodation space;
a pressure measurement body disposed in the accommodation space; and
a temperature measurement body disposed in the accommodation space,
wherein a measurement value of the pressure measurement body and a measurement value of the temperature measurement body are corrected with respect to each other.

* * * * *